US012078126B2

(12) United States Patent
Gros-Borot et al.

(10) Patent No.: US 12,078,126 B2
(45) Date of Patent: *Sep. 3, 2024

(54) AERONAUTIC PROPULSION SYSTEM WITH IMPROVED PROPULSION EFFICIENCY

(71) Applicants: SAFRAN AIRCRAFT ENGINES, Paris (FR); SAFRAN TRANSMISSION SYSTEMS, Colombes (FR)

(72) Inventors: Maeva Daphné Gros-Borot, Moissy-Cramayel (FR); Gilles Alain Marie Charier, Moissy-Cramayel (FR); Matthieu Bruno François Foglia, Moissy-Cramayel (FR); Caroline Marie Frantz, Moissy-Cramayel (FR); Adrien Louis Simon, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/783,721

(22) PCT Filed: Dec. 11, 2020

(86) PCT No.: PCT/FR2020/052391
§ 371 (c)(1),
(2) Date: Jun. 9, 2022

(87) PCT Pub. No.: WO2021/116621
PCT Pub. Date: Jun. 17, 2021

(65) Prior Publication Data
US 2023/0013650 A1     Jan. 19, 2023

(30) Foreign Application Priority Data
Dec. 11, 2019  (FR) ........................................ 1914192
Dec. 11, 2019  (FR) ........................................ 1914193

(51) Int. Cl.
*F02K 3/06*     (2006.01)
*F02C 7/36*    (2006.01)

(52) U.S. Cl.
CPC .................. *F02K 3/06* (2013.01); *F02C 7/36* (2013.01); *F05D 2240/52* (2013.01); *F05D 2260/40311* (2013.01)

(58) Field of Classification Search
CPC ............. F02K 3/06; F05D 2260/40311; F05D 2220/3217; F05D 2200/14; F05D 2250/51
See application file for complete search history.

(56) References Cited

U.S. PATENT DOCUMENTS

| 4,251,987 | A | 2/1981 | Adamson |
| 11,047,339 | B2 | 6/2021 | Pointon et al. |

(Continued)

FOREIGN PATENT DOCUMENTS

| CA | 2 950 551 A1 | 6/2017 |
| CN | 109386384 A | 2/2019 |

(Continued)

OTHER PUBLICATIONS

Dale Rauch, Design Study of an Air Pump and Integral Lift Engine ALF-504 Using the Lycoming 502 Core, Jul. 1972, NASA, NASA CR-120;992, p. 28 & 38 (Year: 1972).*

(Continued)

*Primary Examiner* — Juan G Flores
*Assistant Examiner* — Ryan C Clark
(74) *Attorney, Agent, or Firm* — Sughrue Mion, PLLC (57) ABSTRACT

An aero-propulsion system includes a drive shaft, a low-pressure compressor, a fan shaft driving a fan, a reduction device that couples the drive shaft and the fan shaft, and an inlet channel which extends between the fan and the low-pressure compressor, the inlet having a predetermined mean radius, a ratio between a mean radius of the inlet channel and (Continued)

the mean radius of the low-pressure compressor, on the one hand, and the reduction ratio of the reduction mechanism, on the other hand, being less than 0.35.

16 Claims, 6 Drawing Sheets

(56) References Cited

U.S. PATENT DOCUMENTS

| | | | |
|---|---|---|---|
| 2013/0192198 A1* | 8/2013 | Brilliant | F04D 29/522 |
| | | | 415/220 |
| 2013/0192264 A1* | 8/2013 | McCune | F02K 3/06 |
| | | | 74/395 |
| 2014/0155219 A1* | 6/2014 | McCune | F16H 57/0006 |
| | | | 475/331 |
| 2014/0186158 A1 | 7/2014 | Merry et al. | |
| 2016/0069270 A1* | 3/2016 | Schwarz | F02C 7/36 |
| | | | 415/122.1 |
| 2016/0108807 A1* | 4/2016 | Schwarz | F01D 17/105 |
| | | | 475/331 |
| 2016/0208818 A1* | 7/2016 | Brilliant | F04D 29/321 |
| 2016/0230674 A1* | 8/2016 | Schwarz | F02C 3/04 |
| 2017/0108084 A1* | 4/2017 | Chmylkowski | F16H 1/2818 |
| 2018/0283282 A1* | 10/2018 | Pointon | F02K 3/06 |
| 2018/0291819 A1 | 10/2018 | Sheridan | |
| 2019/0024586 A1* | 1/2019 | Mardjono | F04D 19/02 |
| 2019/0048826 A1* | 2/2019 | Pointon | F02K 3/06 |
| 2020/0040845 A1* | 2/2020 | Swift | F02K 3/06 |

FOREIGN PATENT DOCUMENTS

| | | | | |
|---|---|---|---|---|
| EP | 3 444 468 A1 | 2/2019 | | |
| EP | 3444468 A1 * | 2/2019 | | F01D 1/02 |
| FR | 2 641 333 A1 | 7/1990 | | |

OTHER PUBLICATIONS

International Search Report issued Apr. 12, 2021 in International Application No. PCT/FR2020/052391.
Written Opinion of the International Searching Authority issued Apr. 12, 2021 in International Application No. PCT/FR2020/052391.
French Search Report issued Sep. 1, 2020 in French Application No. 1914193.
French Search Report issued Aug. 27, 2020 in French Application No. 1914192.

* cited by examiner

AERONAUTIC PROPULSION SYSTEM WITH IMPROVED PROPULSION EFFICIENCY

CROSS REFERENCE TO RELATED APPLICATIONS

This application is a National Stage of International Application No. PCT/FR2020/052391, filed Dec. 11, 2020, claiming priority to French Patent Application Nos. 1914192 and 1914193, each filed Dec. 11, 2019, the contents of each of the International Application and the French Patent Applications being herein incorporated by reference in their entireties.

TECHNICAL FIELD

The present application relates to the field of aeronautic propulsion systems, and more specifically double-flow propulsion systems having a high, or even very high, bypass ratio and a high propulsion efficiency.

BACKGROUND

A double-flow propulsion system generally comprises, from upstream to downstream in the direction of gas flow, a fan, a primary flow annular space and a secondary flow annular space. The mass of air drawn in by the fan is therefore divided into a primary flow, which circulates in the primary flow space, and a secondary flow, which is concentric with the primary flow and circulates in the secondary flow space. The fan (or propeller) can be ducted and housed in a fan casing or alternatively unducted and of the USF type (acronym for Unducted Single Fan). The fan blades can be fixed or have a variable pitch, the pitch being adjusted according to the phases of flight by a pitch change mechanism.

The primary flow space passes through a primary body comprising one or more compressor stages, for example a low-pressure compressor and a high-pressure compressor, a combustion chamber, one or more turbine stages, for example a high-pressure turbine and a low-pressure turbine, and a gas exhaust nozzle. Typically, the high-pressure turbine rotates the high-pressure compressor via a first shaft, called the high-pressure shaft, while the low-pressure turbine rotates the low-pressure compressor and the fan via a second shaft, called the low-pressure shaft. The low-pressure shaft is usually housed in the high-pressure shaft.

In order to improve propulsion efficiency of the propulsion system and to reduce its specific consumption as well as the noise generated by the fan, propulsion systems have been proposed having a high bypass ratio, which corresponds to the ratio of secondary flowrate to primary flowrate. High bypass ratio means here a bypass ratio greater than 10, for example comprised between 10 and 80. To achieve such bypass ratios, the fan is decoupled from the low-pressure turbine, thus allowing to independently optimize their respective rotational speed. Generally, the decoupling is achieved using a reduction gear such as an epicyclic or planetary reduction mechanism, placed between the upstream end of the low-pressure shaft and the fan. The fan is then driven by the low-pressure shaft via the reduction mechanism and an additional shaft, called the fan shaft, which is fixed between the reduction mechanism and the fan disc.

This decoupling thus allows to reduce the speed of rotation and the pressure ratio of the fan and to increase the power extracted by the low-pressure turbine. Indeed, the overall efficiency of aeronautic propulsion systems is conditioned in the first order by the propulsion efficiency, which is favorably influenced by a minimization of the variation of kinetic energy of the air crossing the propulsion system. In a propulsion system with a high bypass ratio, most of the flowrate generating the propulsive force is constituted by the secondary flow of the propulsion system, the kinetic energy of the secondary flow being mainly affected by the compression it undergoes when it crosses the fan. The propulsion efficiency and the pressure ratio of the fan are therefore linked: the lower the pressure ratio of the fan, the better the propulsion efficiency.

Beyond its major impact on the propulsion efficiency, the choice of fan pressure ratio also influences various technological characteristics of the propulsion system, including the diameter of the fan (and by extension the external dimensions of the propulsion system and its nacelle, mass and drag), the rotational speed of the fan and the reduction ratio of the reduction mechanism.

In particular, thrust being a first-order function of the mass flowrate of air treated by the propulsion system (mainly constituted by the secondary flow) and of the variation in energy imparted by the fan, the reduction in the compression ratio of the fan involves increasing the air flowrate of the secondary flow in order to maintain the ability of the propulsion system to provide a given required level of thrust. This increase in secondary flowrate induces an increase in external diameter and, by extension, in the mass of the low-pressure modules and in the external drag of the nacelle, both of which have negative effects on the overall energy efficiency of the propulsion system. It is therefore necessary to find a compromise between improving the propulsion efficiency and minimizing the mass and drag penalties induced by the increase in the dimensions of the secondary flow space to optimize the overall energy efficiency of the propulsion system.

In addition, for a given flight condition, the reduction in the fan pressure ratio implies a reduction in the deviation expected on the average blading profile of the fan. This deviation results from the combination of the upstream fan supply speed and the drive speed related to its rotation, the assembly being linked via a triangulation relationship resulting from the composition of the speeds for the passage of the absolute referential to the relative referential of the blading. The upstream speed being related to the flight conditions and to the design of the air inlet of the propulsion system, the reduction in the pressure ratio of the fan is thus accompanied by a reduction in the rotational speed of the fan, resulting from the combination of a high fan radius and the need to keep the local incidence on the fan blades within a range generally comprised between +5 and +15°.

Finally, the reduction ratio between the fan and the low-pressure turbine is directly affected by the selection of a low fan pressure ratio: it is all the higher the lower the fan pressure ratio.

It follows from these observations that, nowadays, a propulsion system must have the following parameters to be competitive, where Engine 1 is at the upper limit of the ducted engines considered as efficient today and Engine 2 corresponds to an engine considered today as very efficient:

| Parameter | Engine 1 | Engine 2 |
|---|---|---|
| Propulsion efficiency | 85% | 92% |
| Bypass ratio | 10 | 31 |
| Fan pressure ratio | 1.29 | 1.04 |

-continued

| Parameter | Engine 1 | Engine 2 |
|---|---|---|
| Peripheral speed of the fan at the vane tip (m/s) | 330 | 260 |
| Reduction ratio between fan and low-pressure turbine | 3.1 | 5.8 |

Here, Engines 1 and 2 are uniaxial architectures (fan concentric with the gas generator), which are considered today as being more efficient for the gas generator than offset architectures (of the turboprop type) because they allow an air supply to the gas generator that is homogeneous azimuthally, for example in the form of a concentric ring gear. In a non-concentric architecture between the fan and the gas generator, the air inlet is generally non-axisymmetric and consists of one or more lobes followed by a deflection pipe.

Finally, the choice of this type of architecture leads to mechanical integration problems that are all the more significant as the pressure ratio of the fan is low. With the same architecture of reduction mechanism, (i) the more the reduction ratio increases and the more its radial size increases so that the reduction mechanism is difficult to be integrated under the primary flow path and (ii) the higher the speed of the low-pressure shaft, the higher the speed of the low-pressure compressor which is driven by the low-pressure shaft, and the lower the mean radius of the low-pressure compressor must be to limit the peripheral speed at the tip of the low-pressure compressor blading.

These two constraints combined lead to an inlet channel of the primary flow path (usually designated by its gooseneck shape) upstream of the low-pressure compressor having a slope that is particularly high as the radial size of the reduction mechanism is high and the mean radius of the low-pressure compressor is low. This results in an increase in aerodynamic losses in this channel and poor supply of the low-pressure compressor which are detrimental to the propulsion efficiency of the propulsion system.

These findings apply both to propulsion systems of the double-flow turbomachine type with a ducted fan, with or without variable fan blade pitch, and to unducted propulsion systems of the USF type. In particular, USF-type architectures allow to further increase the propulsion efficiency: by eliminating the nacelle, it is possible to overcome the induced mass and drag constraints. However, optimization of these architectures leads to even higher reduction ratios: fan speed (propeller) less than 1200 revolutions per minute for the same type of low-pressure compressor and low-pressure turbine as on a turbomachine with a high bypass ratio and ducted fan, leading to reduction ratios of up to 10.

SUMMARY

The present disclosure proposes an aeronautic propulsion system, such as a double-flow turbomachine whose fan is ducted, with or without variable pitch of the fan blades, or an unducted propulsion system of the USF type, having a high bypass ratio and improved propulsion efficiency.

According to a first aspect, the disclosure proposes an aeronautic propulsion system comprising:
  a drive shaft movable in rotation about an axis of rotation,
  a low-pressure compressor driven in rotation by the drive shaft, said low-pressure compressor having a predetermined mean radius,
  a fan shaft,
  a fan driven in rotation by the fan shaft
  a reduction mechanism coupling the drive shaft and the fan shaft, said reduction mechanism comprising a first reduction stage driven in rotation by the drive shaft and a second reduction stage rotating the fan shaft and having a predetermined reduction ratio and
  an inlet channel which extends between the fan and the low-pressure compressor, said inlet channel having an inlet adjacent to the fan and an outlet opposite the inlet and adjacent to the low-pressure compressor, the inlet having a predetermined mean radius.

In addition, a first ratio between a ratio between a mean radius of the inlet channel and the mean radius of the low-pressure compressor and the reduction ratio of the reduction mechanism is strictly less than 0.35, preferably strictly less than 0.30, more preferably strictly less than 0.20.

Some preferred but non-limiting characteristics of the propulsion system according to the first aspect are the following, taken individually or in combination:
  the reduction mechanism has a maximum outer radius and the mean radius of the inlet channel is at most equal to the sum of the maximum outer radius and 300 mm.
  the reduction mechanism has a maximum outer radius and the mean radius of the inlet channel is at least the sum of the maximum outer radius and 100 mm.
  the low-pressure compressor comprises at least one movable blade wheel driven in rotation by the drive shaft and located at the outlet of the inlet channel, each blade of the wheel having a leading edge, a root and a tip and the mean radius of the low-pressure compressor corresponding to the average of the radii of the blades between the root and the tip of the blades along their leading edge.
  the reduction mechanism comprises at least one ring gear comprising first meshing means and a plurality of planet gears comprising second meshing means, the maximum outer radius of the reduction mechanism corresponding to the largest radius between a radius of the ring gear measured in a plane radial to the axis of rotation, between the axis of rotation and a tip of the first meshing means and a radius of the planet gears measured in the radial plane between the axis of rotation and a tip of the second meshing means.
  the reduction ratio is greater than or equal to 4.5.
  the propulsion system is unducted and the reduction ratio is greater than or equal to 6.
  the reduction mechanism is epicyclic or planetary.
  the first stage and the second reduction stage of the reduction mechanism each comprising helical or straight teeth.
  the teeth of the first reduction stage are helical and form an angle comprised between 10° and 30° with the axis of rotation, preferably comprised between 15° and 25°.
  the teeth of the second reduction stage are helical and form an angle comprised between 10 and 30° with the axis of rotation.
  the teeth of the first stage and of the second reduction stage are helical, the propulsion system further comprising an internal bearing gear interposed between a sun gear of the reduction mechanism and the fan shaft.
  the teeth of the first stage and of the second reduction stage are helical, the propulsion system further comprising a thrust bearing gear at the fan, said thrust bearing gear being interposed between the fan shaft and a stator part of the propulsion system.
  the propulsion system has a bypass ratio comprised between 10 and 80.

the fan has a compression ratio comprised between 1.04 and 1.29 when the fan is ducted and between 1.01 and 1.025 when the fan is unducted.

the fan comprises a plurality of fan blades each having a ring gear, a peripheral speed of the fan blades at their tip in take-off speed being comprised between 260 m/s and 330 m/s when the fan is ducted and is less than 225 m/s when the fan is unducted.

According to a second aspect, the disclosure proposes an aeronautic propulsion system comprising:

a drive shaft movable in rotation about an axis of rotation, a fan shaft, a reduction mechanism coupling the drive shaft and the fan shaft, said reduction mechanism having a first reduction stage driven in rotation by the drive shaft and a second reduction stage rotating the fan shaft, the first stage and the second reduction stage of the reduction mechanism each comprising helical teeth, said helical teeth and forming an angle comprised between 10° and 30° with the axis of rotation, preferably comprised between 15° and 25°.

Some preferred but non-limiting characteristics of the propulsion system according to the second aspect are the following, taken individually or in combination:

the propulsion system further comprises a low-pressure compressor driven in rotation by the drive shaft, said low-pressure compressor having a predetermined mean radius, and an inlet channel which extends between the fan and the low-pressure compressor, said inlet channel having an inlet adjacent to the fan and an outlet opposite the inlet and adjacent to the low-pressure compressor, the inlet having a predetermined mean radius. In addition, a ratio between a mean radius of the inlet channel and the mean radius of the low-pressure compressor on the one hand, and the reduction ratio of the reduction mechanism on the other hand, is strictly less than 0.35, preferably strictly less than 0.30, preferably strictly less than 0.20.

the reduction mechanism has a maximum outer radius and the mean radius of the inlet channel is at most equal to the sum of the maximum outer radius and 300 mm.

the reduction mechanism has a maximum outer radius and the mean radius of the inlet channel is at least the sum of the maximum outer radius and 100 mm.

the low-pressure compressor comprises at least one movable blade wheel driven in rotation by the drive shaft and located at the outlet of the inlet channel, each blade of the wheel having a leading edge, a root and a tip and the mean radius of the low-pressure compressor corresponding to the average of the radii of the blades between the root and the tip of the blades along their leading edge.

the reduction mechanism comprises at least one ring gear comprising first meshing means and a plurality of planet gears comprising second meshing means, the maximum outer radius of the reduction mechanism corresponding to the largest radius between a radius of the ring gear measured in a plane radial to the axis of rotation, between the axis of rotation and a tip of the first meshing means and a radius of the planet gears measured in the radial plane between the axis of rotation and a tip of the second meshing means.

the reduction ratio is greater than or equal to 4.5.

the propulsion system is unducted and the reduction ratio is greater than or equal to 6.

the reduction mechanism comprises two reduction stages.

the reduction mechanism is epicyclic.

the reduction mechanism comprises a first reduction stage driven in rotation by the drive shaft and a second reduction stage driving the fan shaft in rotation, the first stage and the second reduction stage of the reduction mechanism comprising each of the helical or straight teeth.

the teeth of the first stage and of the second reduction stage are helical, the propulsion system further comprising an internal bearing gear interposed between a sun gear of the reduction mechanism and the fan shaft.

the teeth of the first stage and of the second reduction stage are helical, the propulsion system further comprising a thrust bearing gear at the fan, said thrust bearing gear being interposed between the fan shaft and a stator part of the propulsion system.

the propulsion system has a bypass ratio comprised between 10 and 80.

the fan has a compression ratio comprised between 1.04 and 1.29 when the fan is ducted and between 1.01 and 1.025 when the fan is unducted.

the fan comprises a plurality of fan blades each having a ring gear, a peripheral speed of the fan blades at their tip in take-off speed being comprised between 260 m/s and 330 m/s when the fan is ducted and is less than 225 m/s when the fan is unducted.

According to a third aspect, the disclosure proposes an aeronautic propulsion system comprising:

a low-pressure body driving a drive shaft in rotation about an axis of rotation, a fan driven in rotation by a fan shaft a reduction mechanism coupling the drive shaft and the fan shaft, the propulsion system comprising two reduction stages and including:

a sun gear, centered on the axis of rotation and configured to be driven in rotation by the drive shaft, a ring gear, coaxial with the sun gear and fixed relative to the propulsion system, and a series of planet gears distributed circumferentially around the axis of rotation between the sun gear and the ring gear, each planet gear comprising a first portion meshed with the sun gear to form the first reduction stage and a second portion meshed with the ring gear to form the second reduction stage, a diameter of the first portion being different from a diameter of the second portion.

Optionally, the planet gears are mounted on a planet carrier which is movable in rotation around the axis of rotation and integral with the fan shaft.

In one embodiment, the low-pressure body comprises a low-pressure turbine driving the rotation shaft and a low-pressure compressor.

Some preferred but non-limiting characteristics of the propulsion system according to the third aspect are the following, taken individually or in combination:

the low-pressure body comprises a low-pressure compressor driven in rotation by the drive shaft, said low-pressure compressor having a predetermined mean radius, and the propulsion system further comprises an inlet channel which extends between the fan and the low-pressure compressor, said inlet channel having an inlet adjacent to the fan and an outlet opposite the inlet and adjacent to the low-pressure compressor, the inlet having a predetermined mean radius. In addition, a ratio between a mean radius of the inlet channel and the mean radius of the low-pressure compressor on the one hand, and the reduction ratio of the reduction mechanism on the other hand, is strictly less than 0.35, preferably strictly less than 0.30, preferably strictly less than 0.20.

the reduction mechanism has a maximum outer radius and the mean radius of the inlet channel is at most equal to the sum of the maximum outer radius and 300 mm.

the reduction mechanism has a maximum outer radius and the mean radius of the inlet channel is at least the sum of the maximum outer radius and 100 mm.

the low-pressure body comprises a low-pressure compressor driven in rotation by the drive shaft, said low-pressure compressor comprising at least one movable blade wheel driven in rotation by the drive shaft and located at the outlet of the inlet channel, each blade of the wheel having a leading edge, a root and a tip and the mean radius of the low-pressure compressor corresponding to the average of the radii of the blades between the root and the tip of the blades along their leading edge.

the ring gear comprises first meshing means and the planet gears comprise second meshing means, the maximum outer radius of the reduction mechanism corresponding to the largest radius between a radius of the ring gear measured in a plane radial to the axis of rotation, between the axis of rotation and a tip of the first meshing means and a radius of the planet gears measured in the radial plane between the axis of rotation and a tip of the second meshing means.

the reduction ratio is greater than or equal to 4.5.

the propulsion system is unducted and the reduction ratio is greater than or equal to 6.

the reduction mechanism comprises two reduction stages.

the reduction mechanism is epicyclic.

the first stage and the second reduction stage of the reduction mechanism each comprise helical or straight teeth.

the teeth of the first reduction stage are helical and form an angle comprised between 10° and 30° with the axis of rotation, preferably comprised between 15° and 25°.

the teeth of the second reduction stage are helical and form an angle comprised between 10 and 30° with the axis of rotation.

the teeth of the first stage and of the second reduction stage are helical, the propulsion system further comprising an internal bearing gear interposed between a sun gear of the reduction mechanism and the fan shaft.

the teeth of the first stage and of the second reduction stage are helical, the propulsion system further comprising a thrust bearing gear at the fan, said thrust bearing gear being interposed between the fan shaft and a stator part of the propulsion system.

the propulsion system has a bypass ratio comprised between 10 and 80.

the fan has a compression ratio comprised between 1.04 and 1.29 when the fan is ducted and between 1.01 and 1.025 when the fan is unducted.

the fan comprises a plurality of fan blades each having a ring gear, a peripheral speed of the fan blades at their tip in take-off speed being comprised between 260 m/s and 330 m/s when the fan is ducted and is less than 225 m/s when the fan is unducted.

According to a fourth aspect, the disclosure proposes an aircraft comprising an aeronautic propulsion system in accordance with the first, second and/or third aspect.

The aeronautic propulsion system can comprise a double-flow turbomachine whose fan is ducted, with or without variable pitch of the fan blades, or an unducted propulsion system of the USF type.

DESCRIPTION OF THE DRAWINGS

Other characteristics, objects and advantages of the disclosure will emerge from the description which follows, which is purely illustrative and not limiting, and which must be read in conjunction with the appended drawings wherein:

FIGS. 4a) and 4b) are schematic views respectively illustrating a two-stage epicyclic reduction mechanism and a single-stage epicyclic reduction mechanism, for the same reduction ratio.

In all the figures, similar elements bear identical references.

DETAILED DESCRIPTION

Figure 1:
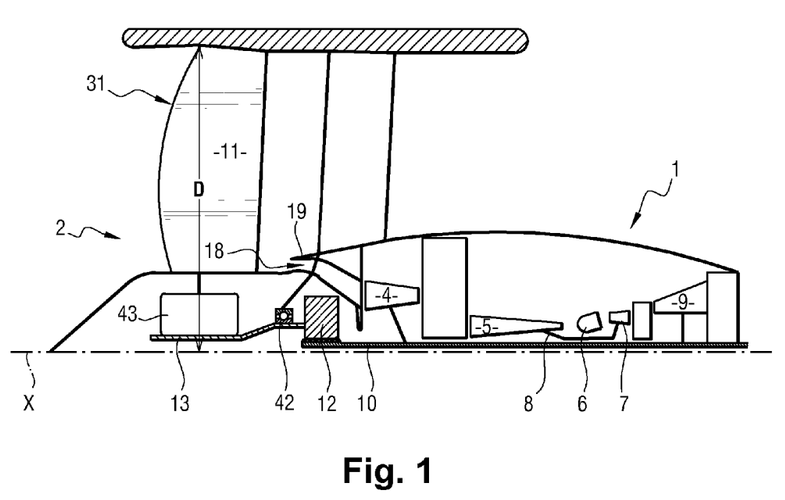
FIG. 1 schematically illustrates an example of an aeronautic propulsion system comprising a variable-pitch ducted fan in accordance with one embodiment of the invention.
Figure 2:
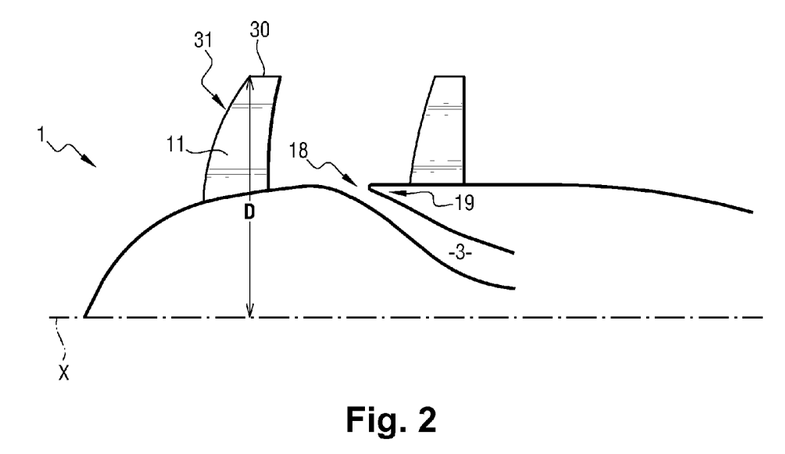
FIG. 2 schematically illustrates an example of an aeronautic propulsion system comprising an unducted fan of the USF type in accordance with one embodiment of the invention.

The propulsion system 1 comprises, conventionally, a fan 2 and a primary body. The primary body comprises, in the direction of gas flow in the propulsion system 1, an inlet channel 3 extending immediately downstream of the fan 2, a low-pressure compressor 4, a high-pressure compressor 5, a combustion chamber 6, a high-pressure turbine 7, a low-pressure turbine 9 and a gas exhaust nozzle. The high-pressure turbine 7 drives the high-pressure compressor 5 in rotation via a high-pressure shaft 8 while the low-pressure turbine 9 drives the low-pressure compressor 4 and the fan 2 in rotation via a drive shaft 10, for example the low-pressure shaft 10.

The fan 2 comprises a fan disc 2 provided with fan blades 11 at its periphery which, when rotated, drive the airflow into the primary and secondary flow spaces of the propulsion system 1.

The low-pressure compressor 4 comprises at least one compression stage comprising a movable blade wheel 14 (rotor) driven by the low-pressure shaft 10 and rotating in front of a series of fixed blades (stators, or rectifiers) distributed circumferentially around the axis X. If necessary, the low-pressure compressor 4 can comprise at least two compression stages. Each blade 15 has a leading edge 16, a trailing edge, a root 17 and a tip 18. The leading edge 16 here means the edge of the blade 15 configured to extend facing the flow of gases entering gear the low-pressure compressor 4. It corresponds to the anterior part of an aerodynamic profile which faces the airflow and which divides the airflow into a lower surface flow and an upper surface flow. The trailing edge, in turn, corresponds to the rear part of the aerodynamic profile, where the lower surface and upper surface flows meet.

The inlet channel 3 extends immediately downstream of the fan 2. It has an inlet 18, adjacent to the root of the fan blades 11, directly below the spout 19 for separating the primary flow space and the secondary flow space and an outlet 20 adjacent to the low-pressure compressor 4. The inlet channel 3 has the general shape of a gooseneck, so that the inlet 18 is radially farther from the axis of rotation X than the outlet 20. The inlet channel 3 comprises, in a manner known per se, an inlet guide wheel (or IGV, acronym for Inlet Guide Vane) comprising a row of fixed blades 21 distributed circumferentially around the axis X. These fixed blades 21 each have a leading edge 22 which is flush with the inlet, a root 23 and a tip 24.

The disclosure applies to any type of double-flow aeronautic propulsion system 1, whether the fan 2 is ducted or unducted, with fixed-pitch or variable-pitch blades.

The propulsion system 1 has a high bypass ratio. High bypass ratio means here a bypass ratio greater than or equal to 10, for example comprised between 10 and 80. For this purpose, the fan 2 is decoupled from the low-pressure turbine 9 to independently optimize their respective speed of rotation using a reduction mechanism 12 placed between the upstream end (relative to the direction of gas flow in the propulsion system 1) of the low-pressure shaft 10 and the fan 2. The fan 2 is then driven by the low-pressure shaft 10 via the reduction mechanism 12 and a fan shaft 13, which is fixed between the reduction mechanism 12 and the fan disc 2. The fan shaft 13 is movable in rotation about an axis of rotation X coaxial with the axis of rotation X of the low-pressure shaft 10.

Optionally, the propulsion system 1 further comprises a pitch change mechanism 43 positioned between the fan disc and the fan blades 11 and configured to modify the pitch angle of the fan blades 11.

To calculate the bypass ratio, the secondary flowrate and the primary flowrate are measured when the propulsion system 1 is stationary at take-off speed in a standard atmosphere (as defined by the International Civil Aviation Organization manual (ICAO), Doc 7488/3, 3rd edition) and at sea level.

In the following, all the parameters will be measured under these conditions, namely when the propulsion system 1 is stationary in take-off speed in a standard atmosphere (as defined by the manual of the International Civil Aviation Organization (ICAO), Doc 7488/3, 3rd edition) and at sea level.

In order to improve the supply of the low-pressure compressor 4, a ratio R between a mean radius R3 of the inlet channel 3 and a mean radius R2 of the low-pressure compressor 4 on the one hand, and the reduction ratio GR of the reduction mechanism 12 is strictly less than 0.35.

$$R = \frac{R3/R2}{GR} < 0.35 \qquad [\text{Math. 1}]$$

Such a ratio R is particularly relevant for a maximum take-off power at the input of the reduction mechanism greater than 6 MW.

Mean inlet radius R3 of the inlet channel 3, means here the sum of the maximum outer radius R1 of the reduction mechanism 12 and the minimum spacing between the reduction mechanism 12 and the inner shroud of the inlet channel 3 for the integration of constituent elements of the propulsion system 1, such as oil recovery, flanges, flexes, etc. This spacing is at least equal, in a plane radial to the axis X, to 100 mm and at most equal to 300 mm, preferably less than 275 mm, typically of the order of 250 mm. Preferably, the ratio R is strictly less than 0.30, preferably strictly less than 0.20.

Mean radius R2 of the low-pressure compressor 4, means here the average of the radii (measured in the radial plane) of the leading edge 16 between the root 17 and the tip 18 of the movable blades 15 of the low-pressure compressor 4. When the low-pressure compressor 4 comprises several compression stages, the mean radius R2 of the low-pressure compressor 4 is measured at the moving wheel 14 located furthest upstream, relative to the direction of flow of the gases, that is to say the moving wheel 14 which extends at the output 20 of the input channel 2.

The mean radius of the inlet channel 3 corresponds to the average of the radii (measured in the radial plane) of the leading edge 22 between the root 23 and the tip 24 of the fixed blades 21 of the inlet channel 3.

In comparison with the engines of the prior art, the propulsion system 1 therefore has, for a high, or even very high, reduction ratio, a reduction mechanism 12 of smaller size. As a result, the slope of the inlet channel 3 of the primary flow path upstream of the low-pressure compressor 4 is gentler, which improves the supply of the low-pressure compressor 4. In parallel, a high reduction ratio (GR) allows to reduce the speed of rotation and the compression ratio of the fan 2 and to optimize the dimensioning of the low-pressure turbine 9. The propulsion efficiency of the propulsion system 1 is therefore improved.

The reduction ratio (GR) is at least equal to 4.5.

In the case of a propulsion system 1 comprising a ducted fan 2 (FIG. 1), and if necessary fan blades 11 with variable pitch, the reduction ratio is greater than or equal to 4.5, for example comprised between 4.5 and 6.

In the case of a propulsion system 1 comprising an unducted fan 2 (FIG. 2), for example of the USF type, the reduction ratio GR greater than or equal to 6 and less than or equal to 14, preferably less than or equal to 12, for example comprised between 7 and 10.

Moreover, a propulsion system 1 having such a ratio GR then comprises an inlet channel 3 whose slope is gentler than conventional engines. This results in a marked improvement in the supply of the low-pressure compressor 4 by reducing the aerodynamic losses in the inlet channel 3, which further improves the propulsion efficiency of the propulsion system 1.

The reduction mechanism 12 comprises at least one ring gear 25 including first meshing means 26 and at least one reduction stage 27 comprising a set of planet gears 28 which each comprise second meshing means 29, 29'. These first and second meshing means 26, 29, 29' comprise, in a manner known per se, straight or helical teeth having a tip separated two by two by a groove. The maximum outer radius R1 of the reduction mechanism 12 then corresponds to the largest radius between:

a radius of the ring gear 25, corresponding to the distance in a plane radial to the axis of rotation X between the axis of rotation X and the tip of the teeth of the first meshing means 26 and a radius of the planet gears 28, corresponding to the distance in the radial plane between the axis of rotation X and the tip of the teeth of the second meshing means 29.

Figure 3:
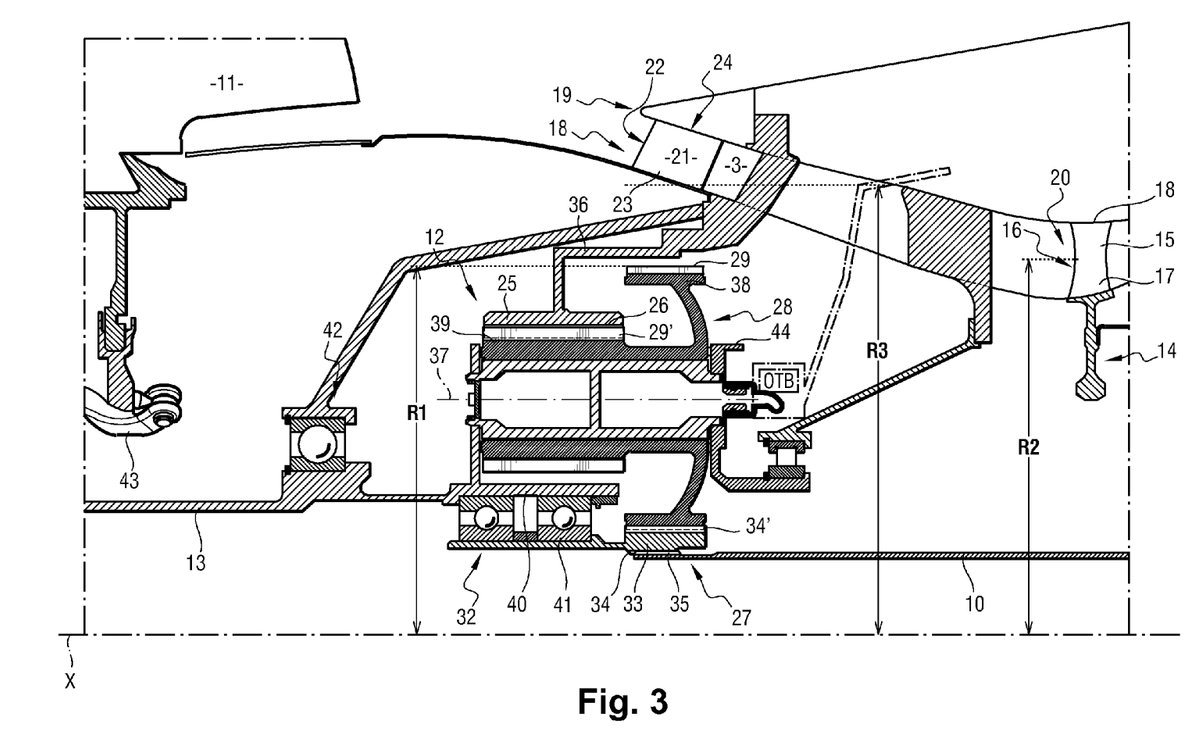
FIG. 3 is a detailed, partial and schematic sectional view of an example of a reduction mechanism that can be used in an aeronautic propulsion system according to the invention.

For example, in FIG. 3, the maximum radius R1 of the reduction mechanism 12 corresponds to the radius of the planet gears 28. Similarly, in FIG. 6, the maximum radius R1 of the reduction mechanism 12 corresponds to the radius of the planet gears 28.

Moreover, in the case of a propulsion system 1 comprising a ducted fan 2, the diameter D of the fan 2 can be comprised between 105 inches (266.7 cm) and 135 inches (342.9 cm). In the case of a propulsion system 1 comprising an unducted fan 2, the diameter D of the fan 2 can be comprised between 150 inches (381 cm) and 180 inches (457.2 cm), for example of the order of 167 inches (424.18 cm). Fan 2 diameter D means here twice the distance, in a plane radial to the axis of rotation X, measured between the axis of rotation X and the tip 30 of the fan blades 11 at the intersection between the leading edge 31 and the tip of the fan blade 11.

In addition, for these fan 2 diameters D, the compression ratio of the ducted fan 2 can be comprised between 1.04 and 1.29 while the pressure ratio of the unducted fan 2 can be comprised between 1.01 and 1.025. The fan 2 compression ratio is measured here under the same conditions as the bypass ratio, that is to say when the propulsion system 1 is stationary at take-off speed in a standard atmosphere (as defined by the manual of the International Civil Aviation Organization (ICAO), Doc 7488/3, 3rd edition) and at sea level.

The bypass ratio of the propulsion system 1 can then be comprised between 10 and 31 in the case of a ducted fan 2 and between 40 and 80 in the case of an unducted fan 2.

The peripheral speed at the tip of the fan blades 11 (that is to say measured at their tip 30) in the take-off speed as defined above is comprised between 260 m/s and 330 m/s when the fan 2 is ducted and is less than 225 m/s when the fan 2 is unducted.

Figure 5:
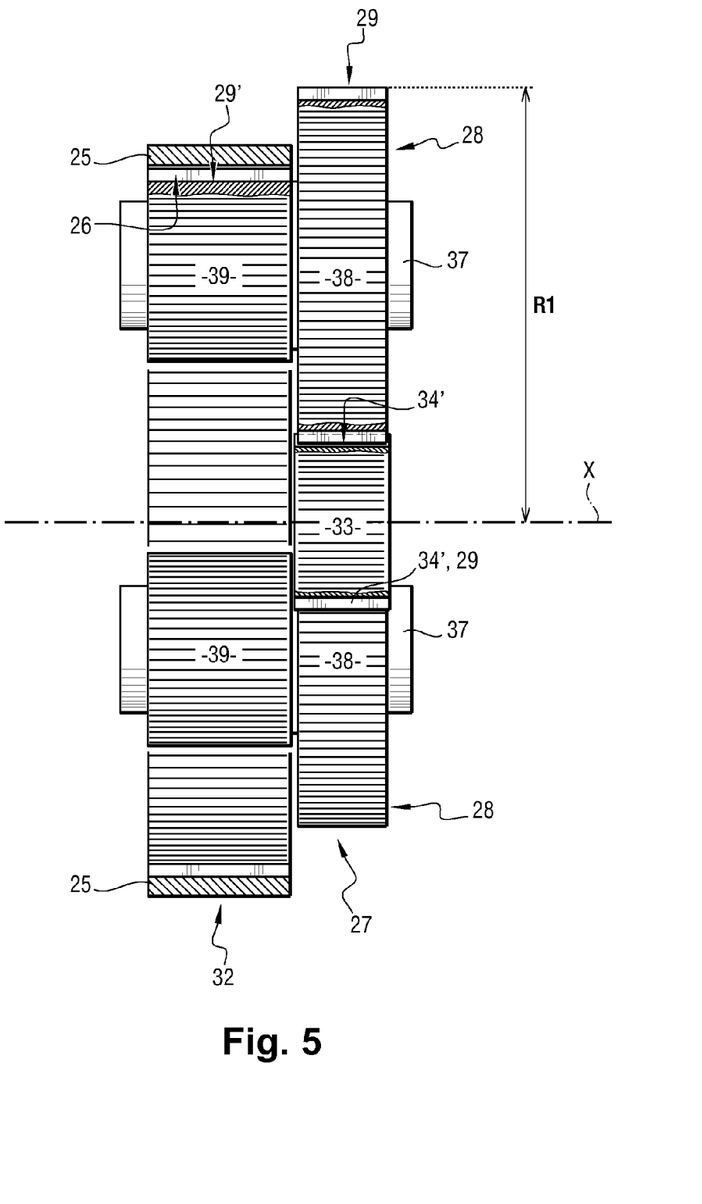
FIG. 5 is a side view of the exemplary embodiment of the reduction mechanism of FIG. 3.

In a first embodiment illustrated in particular in FIG. 5, the reduction mechanism 12 is two-stage and epicyclic. If necessary, the reduction mechanism 12 comprises exactly two reduction stages 27, 32.

More specifically, the reduction mechanism 12 comprises:
- a sun gear 33, centered on the axis of rotation X and configured to be connected at the input to the low-pressure shaft 10. For this purpose, the sun gear 33 comprises a spline 34 on its internal radial surface configured to cooperate with a corresponding spline formed on the upstream end 35 of the low-pressure shaft 10.
- the ring gear 25, coaxial with the sun gear 33. The ring gear 25 is fixed relative to the casing of the propulsion system 1. Typically, the ring gear 25 can be mounted on the inner shroud of the inlet channel 3 via a ring gear holder flange 36.
- a series of planet gears 28, distributed circumferentially between the sun gear 33 and the ring gear 25. The planet gears 28 are mounted on a planet carrier 44 which is movable in rotation around the axis of rotation X. The planet carrier 44 is secured to the fan shaft 13.

Figure 6:
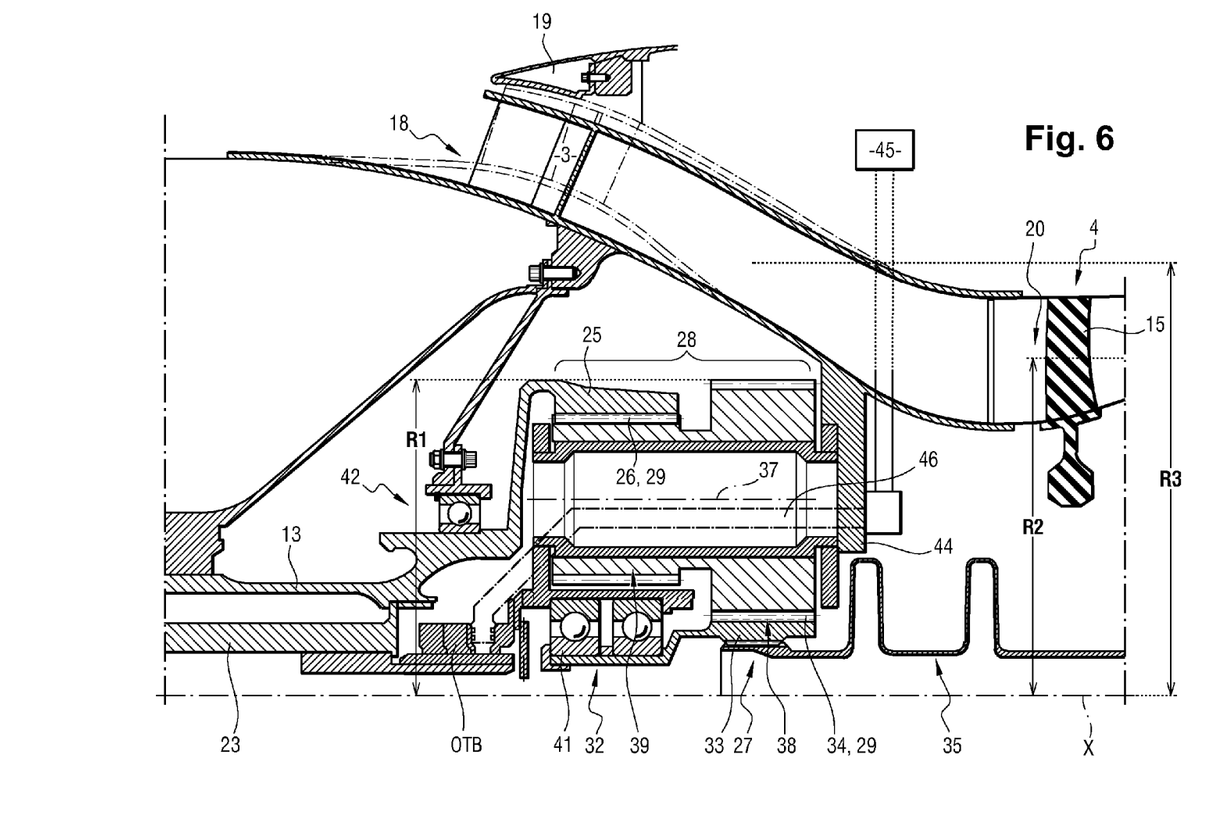
FIG. 6 is a detailed, partial and schematic sectional view of an example of a planetary reduction mechanism that can be used in an aeronautic propulsion system in accordance with the invention. The inlet channel of a propulsion system of the prior art has also been shown in dotted lines in this figure.

In a second embodiment illustrated in FIG. 6, the reduction mechanism 12 is two-stage and planetary. If necessary, the reduction mechanism 12 comprises exactly two reduction stages 27, 32.

Similarly to the two-stage and planetary reduction mechanism, the two-stage and planetary reduction mechanism 12 comprises:
- a sun gear 33, centered on the axis of rotation X and configured to be driven in rotation by the low-pressure shaft 10, which plays the role of a drive shaft,
- a ring gear 25, coaxial with the sun gear 33, and
- a series of planet gears 28 distributed circumferentially around the axis of rotation X between the sun gear 33 and the ring gear 25, each planet gear 28 comprising a first portion 38 meshed with the sun gear 33 and a second portion 39 meshed with the ring gear 25.

However, the reduction mechanism being planetary, the planet carrier 44 is fixed relative to a stator part of the propulsion system 1 and the ring gear 25 is configured to drive the fan shaft 13 in rotation around the axis of rotation X.

Regardless of the type of two-stage reduction mechanism 12 (that is to say epicyclic or planetary), each planet gear 28 is rotatably mounted on the planet carrier 44 about a respective axis of revolution 37, for example via plain bearing gears. Moreover, each planet gear 28 is symmetrical in revolution relative to its axis of revolution 37 and includes two portions 38, 39 of different diameter. Each portion 38, 39 of the planet gears 28 thus forms a stage of the reduction mechanism 12.

More specifically, the first portion 38 of each planet gear 28 is cylindrical of revolution relative to its axis of revolution 37 and has an external radial surface configured to cooperate with the external radial surface of the sun gear 33. For this purpose, the external surface of this first portion 38 comprises a first series of teeth 29 configured to mesh with teeth 34' of the sun gear 33.

The second portion 39 of each planet gear 28 is cylindrical of revolution relative to its axis of revolution 37 and has an external radial surface configured to cooperate with the internal radial surface of the ring gear 25. For this purpose, the external surface of this second portion 39 comprises a second series of teeth 29' configured to mesh with the teeth 26 of the ring gear 25.

The first portion 38 and the second portion 39 of each planet gear 28 are made in one piece. For example, the first portion 38 and the second portion 39 of the same planet gear 28 can be formed integrally and in a single (monolithic) piece. Alternatively, the first portion 38 and the second portion 39 of the same planet gear 28 can be assembled.

Moreover, the planet gears 28 of the same reduction mechanism 12 are identical in shape and size.

Driving in rotation of the sun gear 33 by the low-pressure shaft 10 therefore has the effect of driving the planet gears 28 in rotation around their axis of revolution 37. In the case of an epicyclic reduction mechanism 12, the second portion 39 of the planet gears 28 being meshed with the ring gear 25, which is fixed, their rotation around their axis of revolution 37 has the effect of rotating the planet gears 28 (with their axis of revolution 37 and the planet carrier 44) around the axis of rotation X. Finally, the fan shaft 13 is connected to the second portions 39 of the planet gears 28 so that their rotation around the axis of rotation X has the effect of driving the planet carrier 44 and the fan shaft 13 in rotation about the axis of rotation X. In the case of a planetary reduction mechanism 12, the second portion 39 of the planet gears 28 being meshed with the ring gear 25, which is movable in rotation, their rotation around their axis of revolution 37 has the effect of rotating the planet gears 28 around their axis of revolution 37 (which are fixed on the planet carrier 44, which is fixed relative to the stator) around the axis of rotation X. Finally, the fan shaft 13 is connected to the ring gear 25 so that the rotation of the ring gear 25 around the axis of rotation X has the effect of driving the fan shaft 13 in rotation around the axis of rotation X.

Regardless of the type of reduction mechanism 12, the second portion 39 of the planet gears 28 has a different diameter from their first portion 38. In order to obtain a high propulsion efficiency, the diameter of the second portion 39 is strictly less than the diameter of the first portion 38. It is indeed the difference in diameters between the first portion 38 and the second portion 39 of the planet gears 28 which allows to obtain higher reduction ratios than in a single-stage reduction mechanism 12, for a comparable radial size. It follows that the diameter of the first portion 38 and the diameter of the second portion 39 of the planet gears 28 can thus be dimensioned so as to achieve a reduction ratio greater than or equal to 4.5 with a small radial size, thus allowing to soften the slope of the input channel 3.

Figure 4:
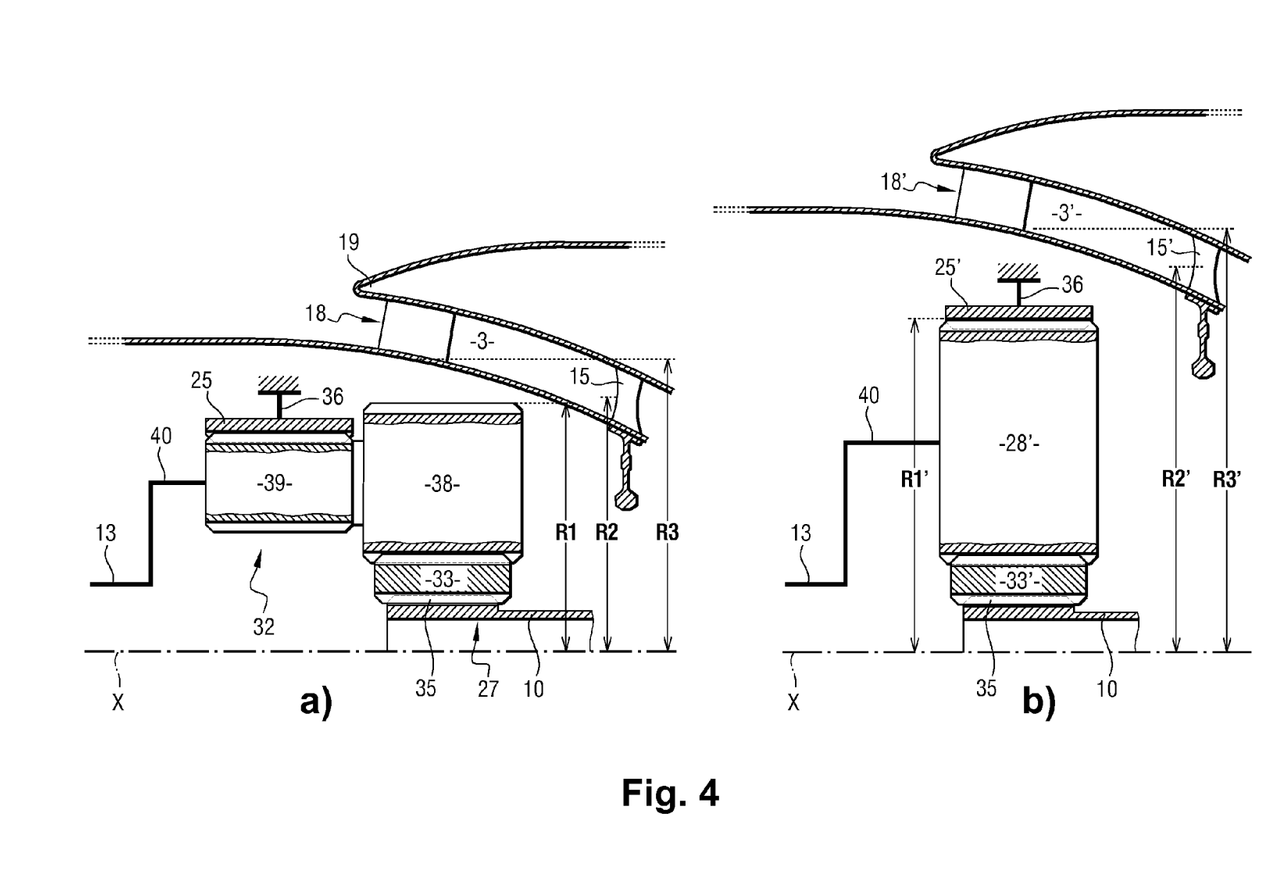

By way of comparison, FIGS. 4a) and 4b) illustrate the radial size obtained for a single-stage epicyclic reduction mechanism 12 (FIG. 4b): ring gear 25', planet gears 28' and sun gear 33', maximum outer radius R1', mean radius R2' of the low-pressure compressor and mean radius R3' of the inlet 18' of the inlet channel 3') and a two-stage epicyclic reduction mechanism 12 (FIG. 4a)), both having the same reduction ratio. This comparison shows that the reduction mechanism 12 with the smallest radial size, for the same reduction ratio, is the epicyclic two-stage reduction mechanism 12.

Figure 7:
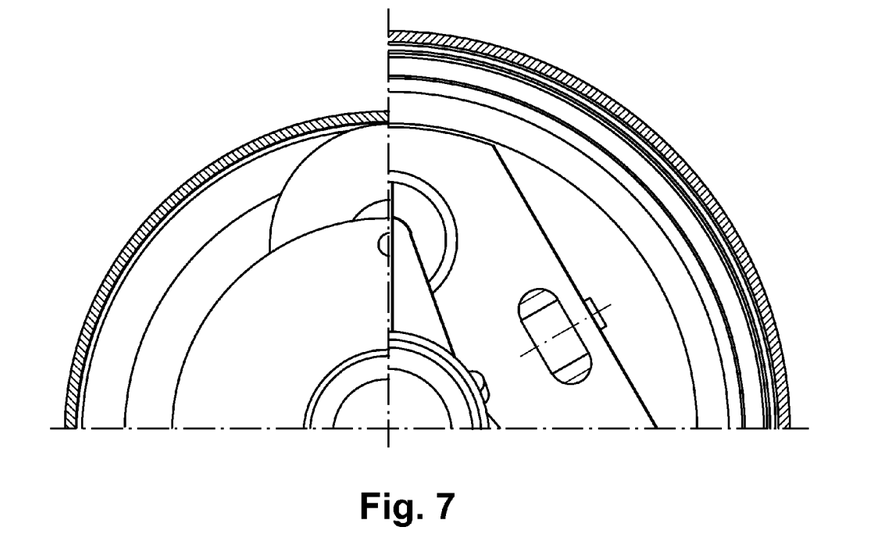
FIG. 7 is a schematic view illustrating on one side (left) a two-stage planetary reduction mechanism and on the other side (right) a single-stage epicyclic reduction mechanism, for the same reduction ratio.

Still by way of comparison, FIG. 7 illustrates the radial size obtained for a two-stage planetary reduction mechanism 12 (on the left in the figure) and a single-stage epicyclic reduction mechanism (on the right of the figure), both having the same reduction ratio. This comparison shows that the reduction mechanism with the smallest radial size, for the same reduction ratio, is the two-stage planetary reduction mechanism 12. Similarly, the shape of the inlet channel 3' is illustrated in FIG. 6 (in dotted lines) when the reduction mechanism is of the single-stage epicyclic type (for the same reduction ratio). As is clearly apparent in this FIG. 3, the slope of the inlet channel 3' is significantly greater than that of the inlet channel 3 of a propulsion system 1 comprising a two-stage planetary reduction mechanism 12, which generates aerodynamic losses and reduces the propulsion efficiency of the propulsion system 1.

In comparison with the engines of the prior art, the propulsion system 1 has, for a high reduction ratio, a reduction mechanism 12 of smaller size. As a result, the slope of the inlet channel 3 of the primary flow path upstream of the low-pressure compressor 4 is gentler, which improves the supply of the low-pressure compressor 4 and allows to lower the radius of the separation nozzle 19, and therefore improve the bypass ratio. At the same time, a high reduction ratio allows to reduce the speed of rotation and the compression ratio of the fan 2 and to optimize the dimensioning of the low-pressure turbine 9. The propulsion efficiency of the propulsion system 1 is therefore improved.

In a first embodiment, the teeth 26, 29, 29', 34' of the reduction mechanism 12 are helical.

In this embodiment, the reduction mechanism 12 may further comprise an internal bearing gear 41, typically a double ball bearing gear or a hydraulic bearing gear, interposed between the sun gear 33 and the fan shaft 13 and configured to take up the axial forces generated between the low-pressure shaft 10 and the first portion 38 of the planet gears 28. Furthermore, the propulsion system 1 comprises a thrust bearing gear 42 at the fan 2, interposed between the fan shaft 13 and a (fixed) stator part of the propulsion system 1 and configured to take up not only the axial forces generated by the fan but also the axial forces generated between the second portion 39 of the planet gears 28 and the ring gear 25.

Optionally, the helical shape of the teeth 26, 29, 29', 34' of the reduction mechanism 12 allows to limit the axial forces taken up by the thrust bearing gear 42. The choice of the helix angles of the teeth 26, 29', 29, 34' and their orientation (sign) thus allows to compensate for the axial forces generated by the fan 2 (upstream) and usually taken up by the thrust bearing gear 42. For example, a helix angle (relative to a plane comprising the axis of rotation X and the axis of revolution 37 of the planet gear 28) of the teeth 29' of the second portion 39 of each planet gear 28 comprised between 10° and 30° allows the meshing between the ring gear 25 and the second portion 39 of the planet gears 28 to generate axial forces downstream and to compensate for the tensile forces applied by the fan 2 to be taken up by the thrust bearing gear 42. The size of the thrust bearing gear 42 at the fan 2 can therefore be reduced thanks to the compensation of the tensile force generated by the fan 2 by the axial force generated by the reduction mechanism 12, more precisely by the meshing of the helical teeth of the ring gear 25 and the second portion 39 of the planet gears 28.

Moreover, a helix angle (relative to a plane comprising the axis of rotation X and the axis of revolution 37 of the planet gear 28) of the teeth 29 of the first portion 38 of each planet gear 28 comprised between 10° and 30°, preferably comprised between 15° and 25°, allows to compensate for the forces at the internal bearing gear 41 of the reduction mechanism 12 and therefore to reduce the losses at this bearing gear 41.

It will further be noted that the use of an epicyclic two-stage reduction mechanism 12 makes the dimensioning of the diameter of the spline of the low-pressure shaft 10 more flexible. Indeed, in iso-size under the inlet channel 3 of the propulsion system 1, the radial size of the ring gear 25 of an epicyclic two-stage reduction mechanism 12 is reduced, which allows, if necessary, to increase the diameter of the spline of the low-pressure shaft 10. For comparison, in the case of a single-stage reduction mechanism, to obtain a high reduction ratio, it is necessary to reduce the diameter of the spline to respect the total radial size of the reduction mechanism 12 under the inlet channel 3.

In a second embodiment, the teeth 26, 29, 29', 34' of the reduction mechanism 12 are straight. In this embodiment, the internal bearing gear 41 is then optional.

Optionally, when the propulsion system 1 comprises a pitch change mechanism 43 configured to change the pitch angle of the fan blades 11, the oil supply requirements for the pitch change mechanism 43 and the lubrication OTB (acronym for Oil Transfer Bearing gear, for multi-passage rotating hydraulic seal or rotating oil transfer) of the reduction mechanism 12 are placed downstream of the reduction mechanism 12 when the latter is of the epicyclic type. On the other hand, when the reduction mechanism 12 is of the planetary type, the OTB can be placed upstream of the reduction mechanism 12, as illustrated in FIG. 6 and comprise a rotating part (indirectly) mounted on the fan shaft 13 and a fixed part mounted on the planet carrier 44. Advantageously, in this configuration, only the portion of the OTB supplying the actuating means of the pitch change mechanism 43 comprises a rotating portion, the OTB being supplied with oil coming from an oil tank 45 via pipes 46 passing through the planet carrier 44, which is fixed.

It can further be noted that the assembly of the epicyclic two-stage reduction mechanism 12 allows to limit the risks of shocks during gear assembly. Indeed, the assembly formed by the sun gear 33, the planet gears 28 and the planet carrier 44 is mounted in one piece from the front thanks to the helical teeth 25, 29, 29', 34'. The ring gear 25 is then brought upstream and attached to the propulsion system 1 via the ring gear-holder flange 25. By way of comparison, in the case of a single-stage reduction mechanism 12, the entire reduction mechanism 12 (sun gear, planet gears, planet carrier and ring gear) must be mounted as a unit due to the presence of herring gearbone teeth. The assembly is then brought into the engine and then fixed using the ring gear-holder flange.

For reduction ratios greater than 8, the two-stage reduction mechanism 12 offers better efficiency. The sliding speeds between the teeth are indeed lower than in a single-stage reduction mechanism 12, which reduces friction and therefore losses. For lower reduction ratios, the efficiency of the two-stage reduction mechanism 12 is comparable to that of a single-stage reduction mechanism 12.

The invention claimed is:

1. A propulsion system comprising:
   a drive shaft movable in rotation about an axis of rotation;
   a low-pressure compressor driven in rotation by the drive shaft, said low-pressure compressor having a predetermined mean radius;
   a fan shaft;
   a fan driven in rotation by the fan shaft;
   a reduction mechanism coupling the drive shaft and the fan shaft, the reduction mechanism comprising a first reduction stage driven by the drive shaft and a second reduction stage that drives the fan shaft and having a reduction ratio;
   and an inlet channel which extends between the fan and the low-pressure compressor, the inlet channel having an inlet adjacent to the fan and an outlet opposite the inlet and adjacent to the low-pressure compressor, the inlet channel having a mean radius;
   wherein a first ratio between a ratio of the mean radius of the inlet channel and the mean radius of the low-pressure compressor, and the reduction ratio of the reduction mechanism, is strictly less than 0.35.

2. The propulsion system according to claim 1, wherein the reduction mechanism has a maximum outer radius and the mean radius of the inlet channel is at most equal to a sum of the maximum outer radius and 300 mm.

3. The propulsion system according to claim 1, wherein the reduction mechanism has a maximum outer radius and the mean radius of the inlet channel is at least equal to a sum of the maximum outer radius and 100 mm.

4. The propulsion system according to claim 1, wherein the low-pressure compressor comprises at least one rotative wheel driven in rotation by the drive shaft and located at the outlet of the inlet channel, wherein the wheel comprises blades, each blade having a leading edge, a root and a tip and the mean radius of the low-pressure compressor comprising to an average of radii of one blade at the root and the tip along their leading edge.

5. The propulsion system according to claim 1, wherein the reduction mechanism comprises a ring gear comprising first meshing means and a plurality of planet gears comprising second meshing means, the maximum outer radius of the reduction mechanism corresponding to a largest radius between a radius of the ring gear measured in a plane radial to the axis of rotation between the axis of rotation and a tip of the first meshing means and a radius of the planet gears measured in the radial plane between the axis of rotation and a tip of the second meshing means.

6. The propulsion system according to claim 1, wherein the reduction ratio is greater than or equal to 4.5.

7. The propulsion system according to claim 6, wherein the propulsion system is unducted and the reduction ratio being greater than or equal to 6.

8. The propulsion system according to claim 1, wherein the first ratio is strictly less than 0.20.

9. The propulsion system according to claim 1, wherein the reduction mechanism comprises an epicyclic gear train or a planetary gear train.

10. The propulsion system according to claim 1, wherein the first reduction stage and the second reduction stage each comprise helical or straight teeth, and
    wherein the reduction ratio is greater than or equal to 4.5.

11. The propulsion system according to claim 10, wherein the teeth of the first reduction stage are helical and form an angle comprised between 10° and 30° with the axis of rotation.

12. The propulsion system according to claim 10, wherein the teeth of the second reduction stage are helical and form an angle comprised between 10 and 30° with the axis of rotation.

13. The propulsion system according to claim 10, wherein the teeth of the first stage and of the second reduction stage are helical, the propulsion system further comprising an internal bearing gear interposed between a sun gear of the reduction mechanism and the fan shaft.

14. The propulsion system according to claim 10, wherein the teeth of the first stage and of the second reduction stage are helical, the propulsion system further comprising a thrust bearing gear at the fan, said thrust bearing gear being interposed between the fan shaft and a stator part of the propulsion system.

15. The propulsion system of claim 1 wherein the first ratio is strictly less than 0.30.

16. The propulsion system according to claim 10, wherein the teeth of the first reduction stage are helical and form an angle comprised between 15° and 25° with the axis of rotation.

* * * * *